United States Patent [19]

Dearman

[11] 4,356,615

[45] Nov. 2, 1982

[54] APPARATUS AND METHODS FOR USE IN WELDING

[76] Inventor: Timothy C. Dearman, P.O. Box 937, Pearland, Tex. 77581

[21] Appl. No.: 141,051

[22] Filed: Apr. 17, 1980

[51] Int. Cl.³ .................. B23P 11/00; B23P 19/02; B23P 19/04; B23K 37/04
[52] U.S. Cl. ............................. 29/525; 29/428; 29/234; 29/252; 29/281.5; 29/283.5; 228/49 B; 269/43
[58] Field of Search .............. 29/525, 234, 244, 252, 29/272, 283.5, 281.5, 281.4, 428; 228/44.5, 49 B; 269/43

[56] References Cited

U.S. PATENT DOCUMENTS

| | | | |
|---|---|---|---|
| 1,894,835 | 1/1933 | Smith et al. | 29/234 |
| 2,429,053 | 10/1947 | Forbes, Jr. | 29/234 |
| 3,522,647 | 8/1970 | Holcomb et al. | 228/184 |
| 3,593,402 | 7/1971 | Mori | 228/44.5 |
| 3,618,845 | 11/1971 | Totten | 228/49 B |
| 3,658,231 | 4/1972 | Gilman | 228/44.5 |
| 3,711,920 | 1/1973 | Simmons, Jr. | 29/281.5 |
| 3,722,038 | 3/1973 | Arntz et al. | 269/43 |
| 3,734,387 | 5/1973 | Sannipoli | 228/184 |
| 3,828,413 | 8/1974 | Province et al. | 29/252 |
| 3,920,232 | 11/1975 | Clark | 29/281.5 |
| 3,952,936 | 4/1976 | Dearman | 228/49 B |
| 4,039,115 | 8/1977 | Randolph et al. | 228/49 B |
| 4,176,269 | 11/1979 | Merrick et al. | 228/44.5 |
| 4,263,084 | 4/1981 | Takala | 269/43 |

FOREIGN PATENT DOCUMENTS

| | | | |
|---|---|---|---|
| 2827343 | 1/1980 | Fed. Rep. of Germany | 228/49 B |
| 47-14216 | 6/1972 | Japan | 228/44.5 |
| 415122 | 11/1972 | U.S.S.R. | 228/44.5 |
| 659331 | 4/1979 | U.S.S.R. | 228/49 B |

*Primary Examiner*—Daniel C. Crane
*Attorney, Agent, or Firm*—Learman & McCulloch

[57] ABSTRACT

Apparatus and methods for use in aligning and welding in end-to-end relation a pair of members such as pipe sections or a cylindrical vessel and closure wall and wherein one of the members is subjected to a clamping force adjacent the end to be welded to produce a predetermined configuration at that end. The other member is supported with that end to be welded confronting the adjacent end of the first member. A clamping force then may be applied to the second member so as to conform its configuration to one corresponding to that of the end of the first member. While maintaining the two members clamped, their positions are adjusted relatively to one another to locate their adjacent ends in a predetermined manner, following which the two members are moved relatively in a direction toward one another to a welding position in which the welding operation may be completed.

28 Claims, 24 Drawing Figures

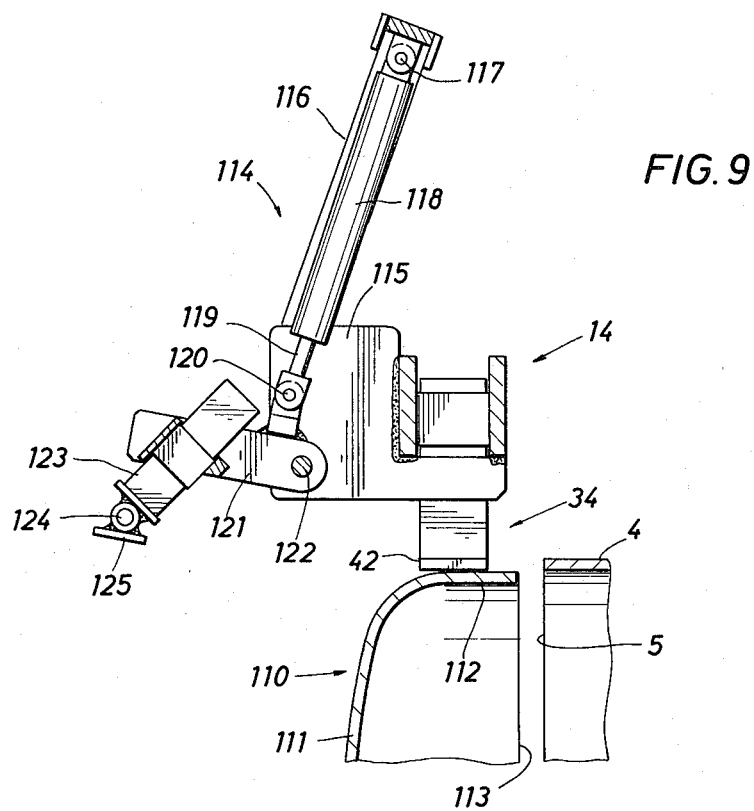
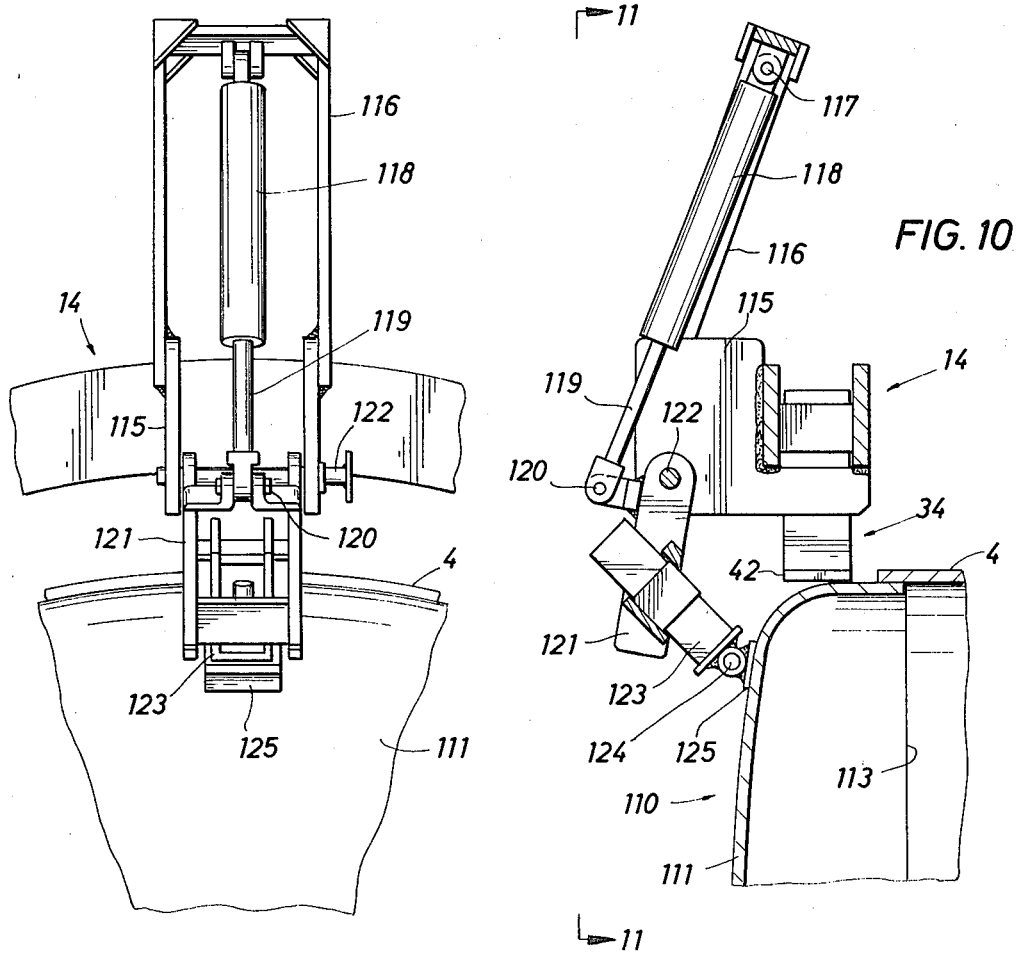
FIG. 9
FIG. 10
FIG. 11

APPARATUS AND METHODS FOR USE IN WELDING

BACKGROUND OF THE INVENTION

This invention relates to apparatus and methods for use in welding two members together and more particularly to apparatus and methods for use in fitting, prior to welding, two pipe sections in end-to-end or telescoping relation. The apparatus also is particularly adapted for fitting an end closure to one end of a generally cylindrical vessel for subsequent welding of the closure to the vessel.

In the welding of large diameter pipe sections to one another it is extremely difficult to position and maintain the pipe sections in proper positions end-to-end so that they properly may be welded to one another. The difficulty is increased in those instances in which the configurations of the adjacent ends of the two sections do not conform exactly or wherein the end of one section is to be telescoped relative to the end of the adjacent section. Even greater difficulty is encountered in those instances in which a concavo-convex end closure is to be welded to an end of a substantially cylindrical vessel.

Apparatus constructed and operated in accordance with the invention minimizes greatly the difficulties heretofore encountered in fitting together and welding members of the kind referred to and greatly simplifies pre-welding operations, minimizes the time to effect a weld, and minimizes the possibility of inferior welds being obtained.

SUMMARY OF THE INVENTION

In welding together two members according to the invention one member is secured in fixed position on a support and encircled by a clamp adjacent that end which is to be welded, the clamp exerting a radially compressive force on the member to reform the shape of the end to a cylindrical or substantially cylindrical configuration. The second member is brought to a position adjacent the end of the first member with the adjacent ends of the two members confronting one another. A second clamp encircles the second member adjacent the end that is to be welded and exerts a radial force on the second member to reform its end to a configuration compatible with the end of the first member.

If the two members are to be welded end-to-end, the end of the second member is shaped to correspond to the confronting end of the other member. If the second member is to be telescoped within the first member, the second member initially has a nominal outside diameter corresponding substantially to the inside diameter of the first member. In this instance the clamps encircling the members apply a radially compressive force to the respective members to conform their shapes and enable the second member to telescope into the first member.

Reformation of the ends of adjacent members usually requires that the members be shifted transversely or rocked, or both, to arrange the confronting ends properly for welding. Further, following proper arrangement of the confronting ends, the members require movement toward one another, particularly when one member is to be telescoped into the other. Apparatus constructed according to the invention enables all of these requirements to be met.

DESCRIPTION OF THE DRAWINGS

The construction and operation of the invention, and the advantages thereof, are explained in the following description and are disclosed in the accompanying drawings, wherein:

FIG. 9 is a sectional view taken on the line 9—9 of FIG. 2;

FIG. 10 is a view similar to FIG. 9, but illustrating the apparatus in an adjusted position;

FIG. 11 is a view taken on the line 11—11 of FIG. 10;

DETAILED DESCRIPTION

Apparatus constructed in accordance with the invention is designed for the purpose of facilitating the fitting together and welding of two members, such as two large diameter pipe sections or a cylindrical vessel and end closure. The apparatus includes a fixed support for one of the members to be welded and an annular clamp that is adapted to encircle and clamp such member adjacent that end of the latter to which the second member is to be welded. The apparatus also includes a second annular clamp member adapted to encircle the second member that is to be welded to the first member, the two clamp members being spaced apart a distance sufficient to enable the confronting ends of the members to be welded together to lie in an exposed position between the two clamp members. The clamp that encircles the second member is capable of adjustment relative to the other clamp so as to enable the second member to be shifted relatively to the first member for purposes of aligning the two members to be welded together, and the adjustment of the adjustable clamp member is effected by adjusting means carried by the fixed clamp member. Following alignment of the two members to be welded together, the clamp members may be moved relatively to one another in a direction to move the confronting ends of the members toward one another to a welding position in which the two members may be welded. The two members may be butt welded or, if desired, one may be telescoped within the other. Following the welding operation, the clamps are released and the welded members removed or relocated for subsequent use of the apparatus in another welding operation.

Figure 1:
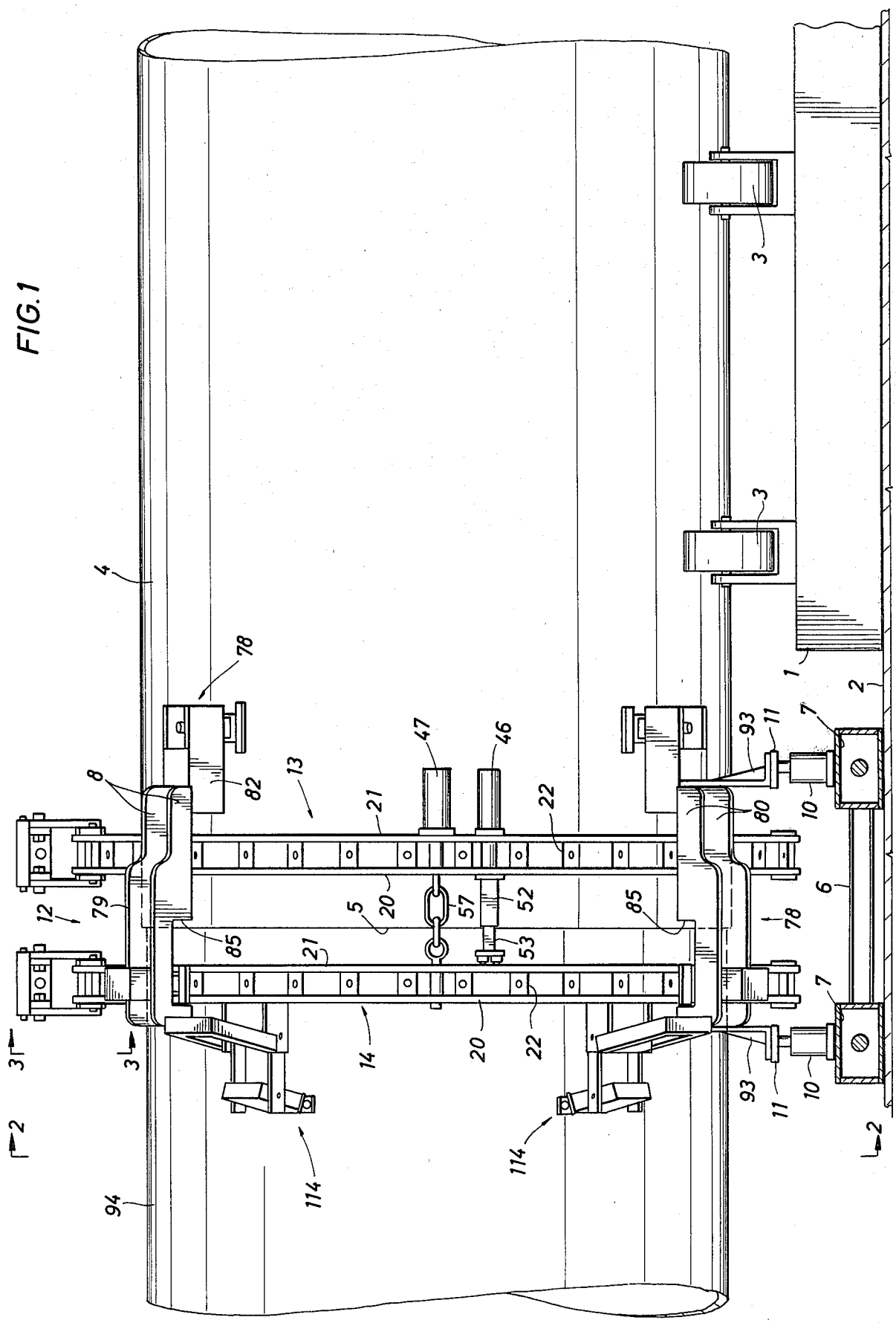
FIG. 1 is a fragmentary, side elevational view, partly broken away, illustrating the apparatus supporting two pipe lengths in positions to be welded to one another.
Figure 2:
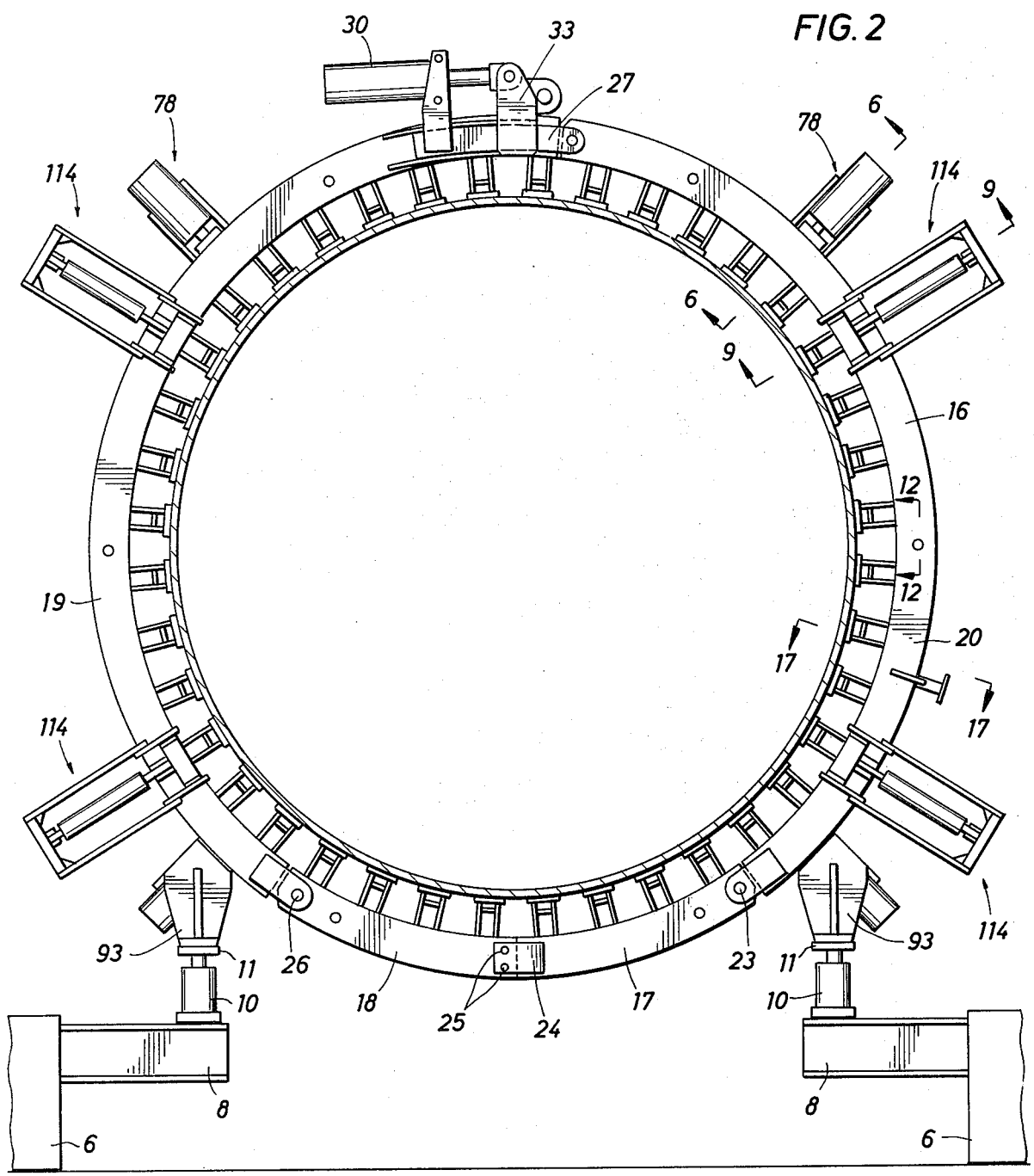
FIG. 2 is a sectional view taken on the line 2—2 of FIG. 1.

The embodiment of the invention disclosed in FIGS. 1 and 2 includes a fixed supporting base 1 mounted on a floor 2 or other structure. Fixed on the base 1 is a plurality of pairs of spaced supporting rollers 3 which form a cradle for a large diameter (up to six feet or more), tubular, metallic pipe section or vessel 4 of generally cylindrical configuration and having a free end 5. The member 4 is placed in the cradle formed by the rollers 3 so that the free end 5 extends beyond the supporting base 1, as is best shown in FIG. 1.

Underlying the free end 5 of the member 4 is a pair of supporting bases 6 arranged one on each side of a vertical plane passing through the longitudinal axis of the member 4. Each support 6 has a pair of spaced, parallel recesses 7 therein and in which is slidably accommodated an arm 8. Each arm is reciprocable by means of a hydraulic ram 9 (see FIGS. 18 and 19). At the free end of each arm 8 is an upstanding, hydraulic ram 10 having an extensible and retractable supporting foot or pad 11. The feet 11 provide a separable support for clamping apparatus presently to be described.

Clamping apparatus according to the invention is designated generally by the reference character 12 and comprises a pair of annular clamp units 13 and 14 substantially parallel to and spaced apart from one another. Each clamp unit is the same and comprises a plurality of arcuate segments 16, 17, 18, and 19. Each segment comprises a pair of parallel bars 20 and 21 joined by spacers 22. The segment 16 is pivoted to the adjacent segment 17 as at 23, the segment 17 is separably fixed to the segment 18 by ears 24 fixed to the bars 20 and 21, and having openings therein which may be aligned with openings in the plates of the segment 18 to accommodate removable pins 25. The segment 18 is pivoted to the segment 19 as at 26.

Figure 3:
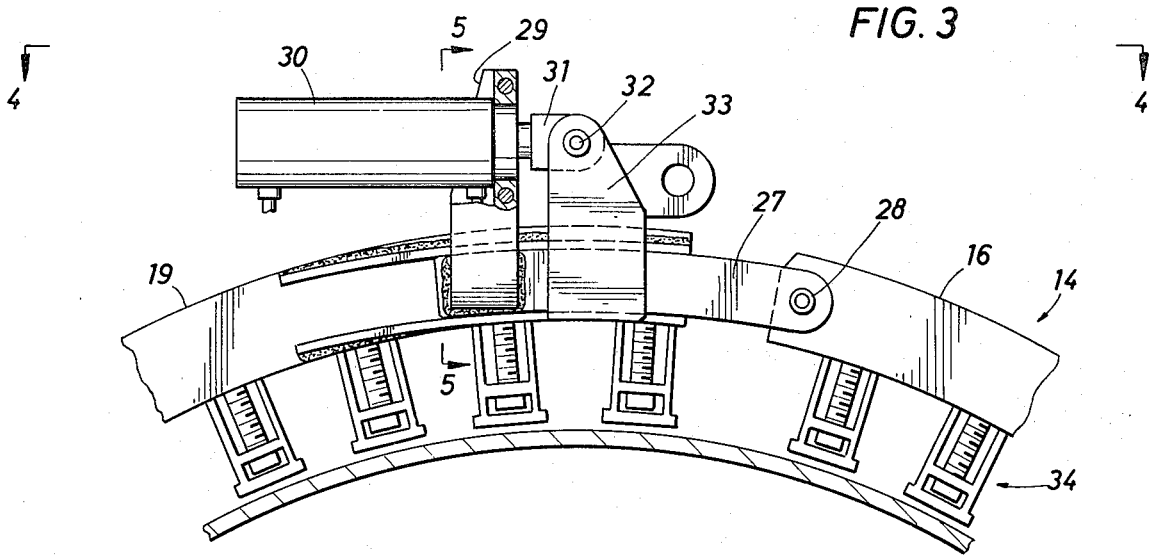
FIG. 3 is a fragmentary, enlarged, partly elevational and partly sectional view of a portion of the apparatus shown in FIG. 1 and viewed in the direction of the arrows 3—3.
Figure 4:
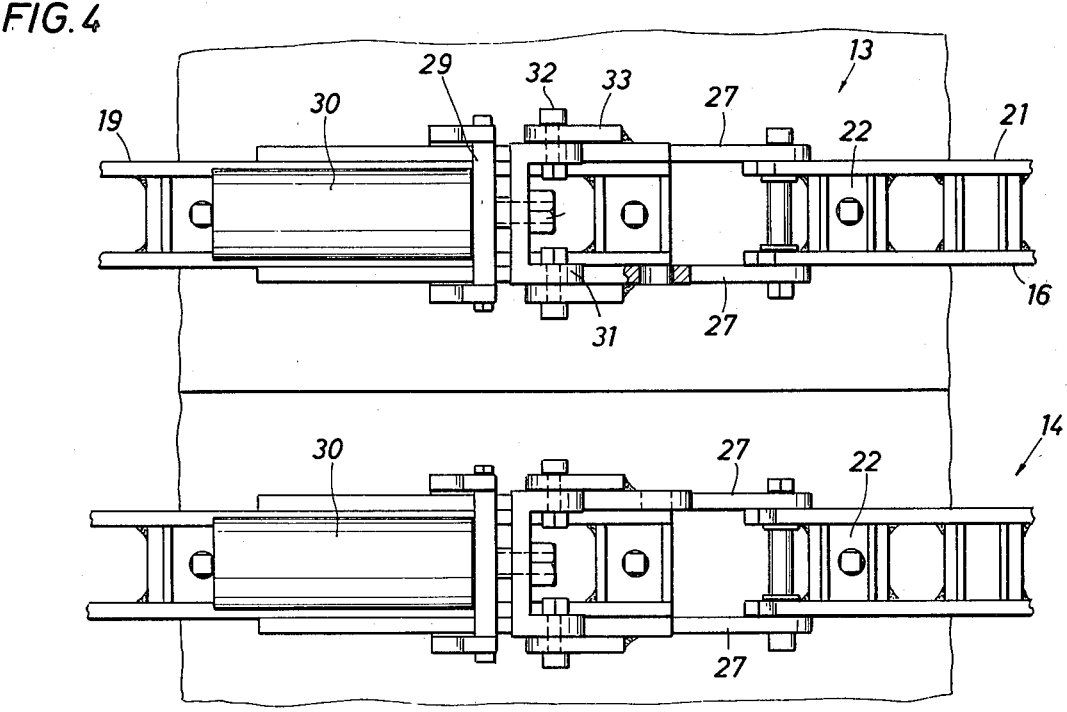
FIG. 4 is a fragmentary top plan view as viewed in the direction of the arrows 4—4 of FIG. 3.
Figure 5:
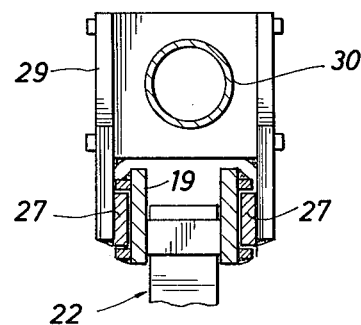
FIG. 5 is a sectional view taken on the line 5—5 of FIG. 3.
Figure 18:
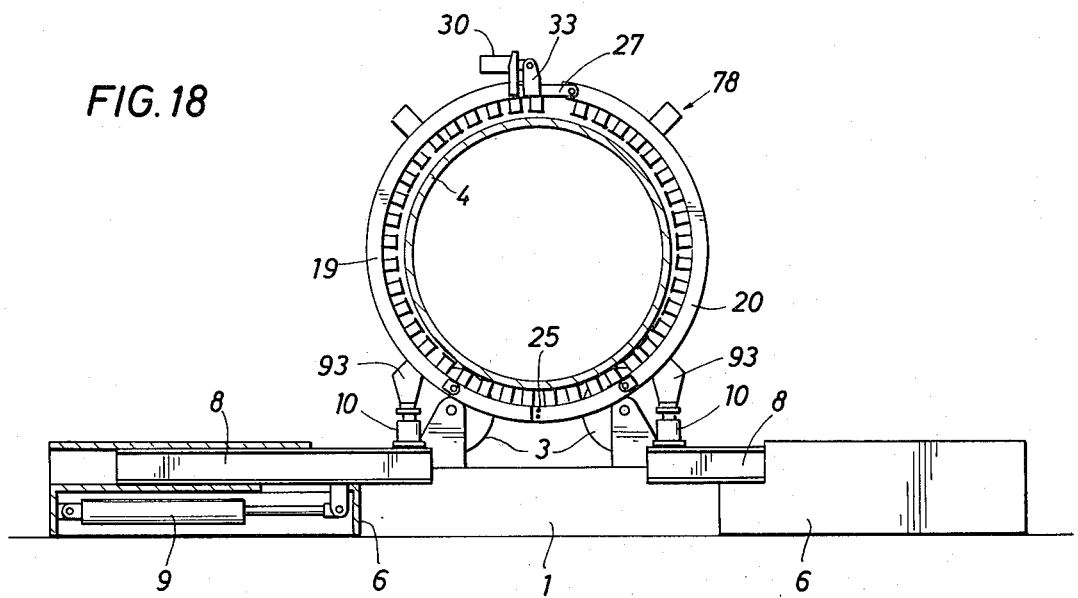
FIG. 18 is a diagrammatic view partly in end elevation and partly in section and illustrating the clamping mechanism in expanded condition.
Figure 19:
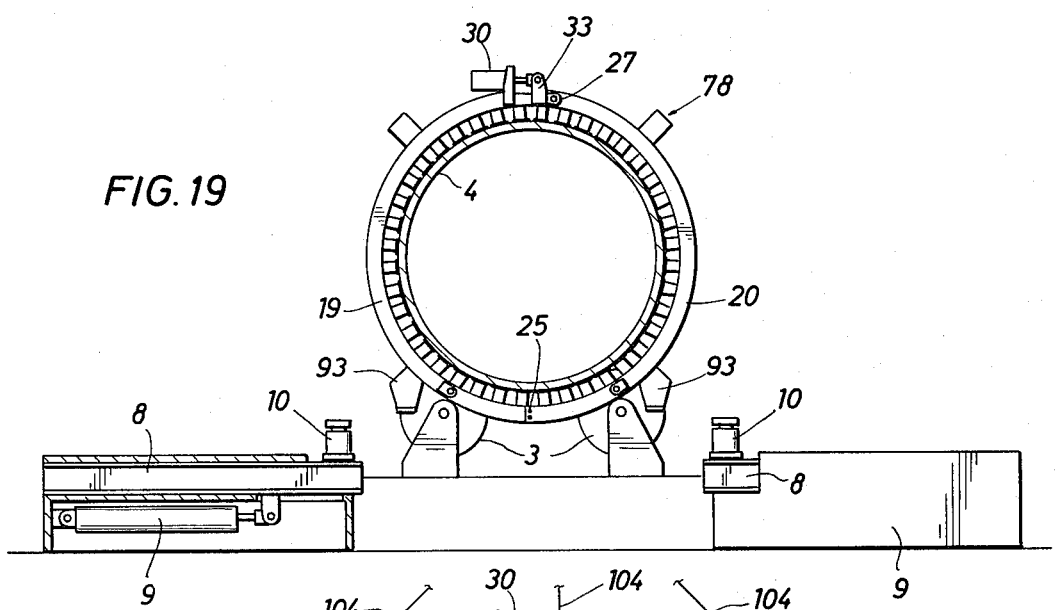
FIG. 19 is a view similar to FIG. 18, but illustrating the clamping mechanism in clamping condition.

The confronting ends of the segments 16 and 19 of each clamp unit are coupled by tongues 27 pivoted at one end to the segment 16 as at 28, the tongues flanking the segment 19. Fixed to the tongues 27 is a bracket 29 on which is mounted a hydraulic ram 30, the piston rod 31 of which is pivoted as at 32 to a bracket 33 which is fixed to the tongues 27. The arrangement is such that, when the ram 30 is retracted, the associated clamp unit 13 or 14 assumes a radially expanded condition, as is shown in FIGS. 3 and 18, and when the ram 30 is expanded, the associated clamp unit assumes a radially contracted condition, as is shown in FIGS. 2 and 19.

Figure 13:
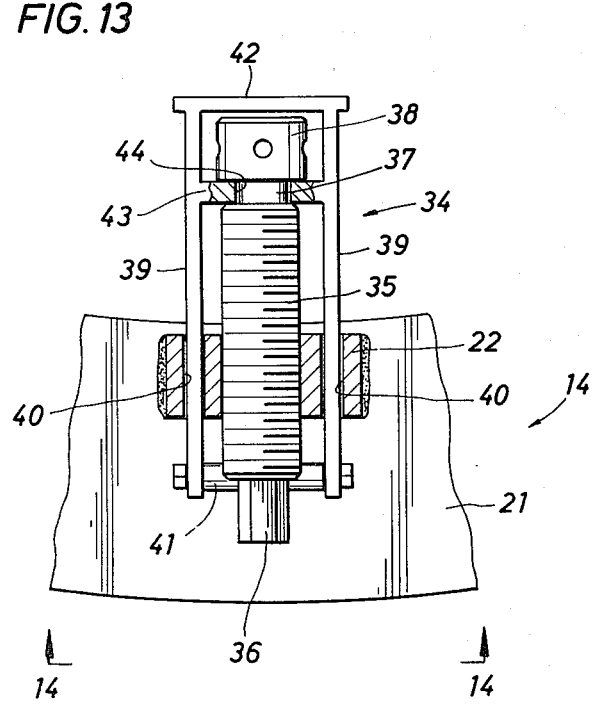
FIG. 13 is an enlarged elevational view, partly in section, of a bearing member forming part of a clamp.

Each of the clamp units 13 and 14 is provided with a plurality of adjustable pressure devices 34. Each pressure devices comprises a screw 35 extending through a threaded opening in a spacer 22. The screw 35 has a head 36 at its radially outer end and a smooth neck 37 adjacent its radially inner end to which is fixed an enlargement 38 (FIG. 13). Straddling the screw 35 is a pair of plates 39 which pass through slots 40 in the spacer 22. The arms 39 are joined at their radially outer end by pins 41 and at their radially inner ends by a web or pad 42. Parallel to and spaced from the web 42 is a partition 43 having an opening 44 therein in which the screw neck 37 is rotatably accommodated. The spacing between the web 42 and the partition 43 is sufficient to accommodate the enlargement 38. The arrangement is such that rotation of the screw 35 in one direction causes movement of the web 42 radially inwardly of the associated clamp unit, and rotation of the screw in the opposite direction causes radially outward movement of the web.

The clamp units 13 and 14 are separate and independent of one another, but a plurality of drive means is provided and spaced circumferentially of the clamp units to adjust the spacing between the units by relative movement of the units toward and away from one another. In the embodiment illustrated in FIGS. 1 and 12, each drive means includes a pair of hydraulic drive rams 46 and 47 carried by the clamp unit 13. The drive ram 46 has a piston rod 48 extending through a guide 49 between the bars 20 and 21. The free end of the piston rod 48 is pivoted as at 50 to a plunger 51 accommodated in a guide housing 52 fixed to the bar 20. At the free end of the plunger 51 is a plate 53 on which is mounted a pair of roller assemblies 54 which confront the clamp unit 14. The drive ram 47 has a piston rod 45 accommodated in a guide 56 and having its free end connected to a tensile force transmitting chain 57 by means of which the clamp units 13 and 14 are coupled to one another.

Figure 12:
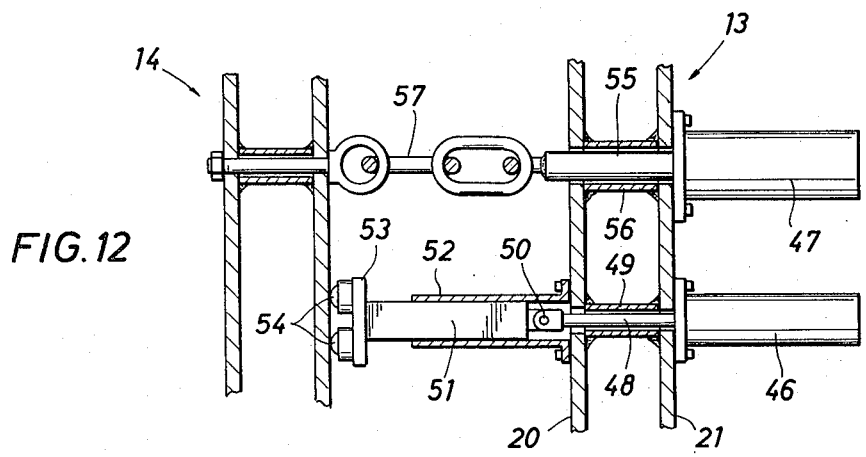
FIG. 12 is an enlarged, sectional view taken on the line 12—12 of FIG. 2.

When the ram 46 is extended, as shown in FIG. 12, the spacing between the clamp units 13 and 14 is at a maximum, and such maximum spacing is limited by the chains 57. When the rams 46 and 47 are retracted, the clamp unit 14 will be moved, via the chains 57, toward the clamp unit 13.

A modified form of driving means for effecting movement of the clamp units toward and away from one another is shown in FIGS. 21–24. In this embodiment, a plurality of circumferentially spaced drive members 60 is provided and each includes a bracket 61 fixed to the clamp unit 13 and on which is pivoted as at 62 an arm 63 having a chamber 64 therein. Accommodated in the chamber is a cylinder 65 within which is a hydraulic ram 66. The ram 66 is pivoted to the end wall 67 of the cylinder 65 and the piston rod 68 of the ram is pivoted to the inner end wall 69 of the chamber 64. The cylinder 65 thus is reciprocable in the chamber 64.

The cylinder 65 has a pair of spaced apart lugs 70 which extend through a slot 71 in the wall of the chamber 64, the spacing between the lugs 70 being such as to enable them to straddle the clamp unit 14. Extension and retraction of the ram 66 thus effects reciprocation of the lugs 70 and, consequently, movement of the clamp unit 14 toward and away from the clamp unit 13.

Figure 21:
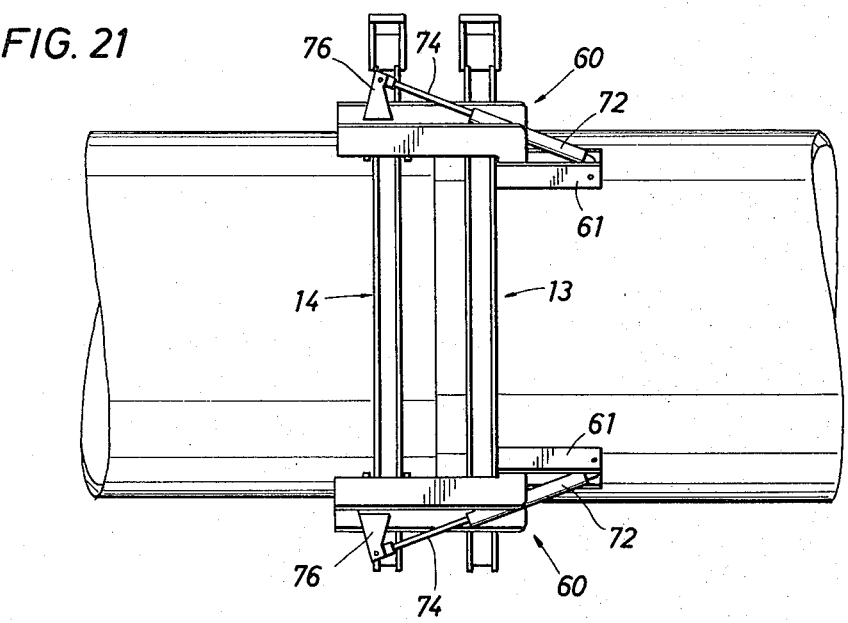
FIG. 21 is a side elevational view, on a reduced scale, and illustrating apparatus which is a modification of that shown in FIG. 12.
Figure 22:
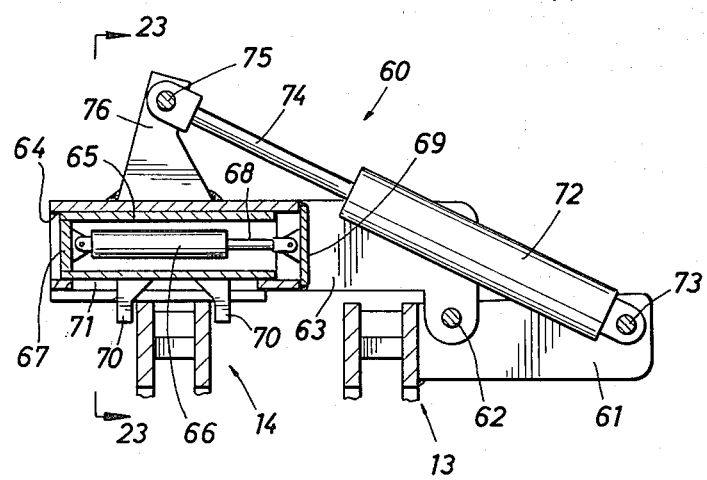
FIG. 22 is a sectional view of a portion of the apparatus shown in FIG. 21.
Figure 23:
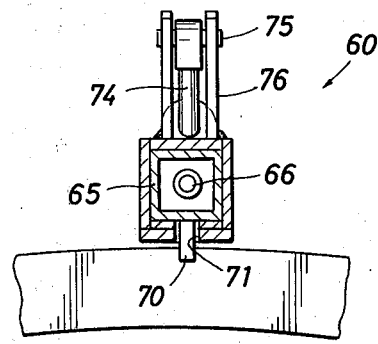
FIG. 23 is a sectional view taken on the line 23—23 of FIG. 22.

It is preferred that the arm 63 of the driving means 60 be movable into and out of driving relationship with the clamp unit 14. Accordingly, a hydraulic ram 72 has one end thereof pivoted as at 73 to the bracket 61 and has its piston rod 74 pivoted as at 75 to an ear 76 fixed to the arm 63. Extension of the ram 72 moves the arm 63 to a position in which the driving lugs 70 straddle the clamp unit 14, as is shown in FIGS. 21 and 22, whereas retraction of the ram 72 effects swinging movement of the arm 63 and its associated parts clockwise to the position shown in FIG. 24.

The apparatus includes shifting means 78 for effecting relative movements of the clamp units 13 and 14 in their own planes, i.e., transversely of the longitudinal axis of the member 4. The shifting means 78 comprises four identical units, such units being uniformly spaced circumferentially of the clamp units. Each shifting unit 78 comprises a body 79 (see particularly FIG. 6) that is welded to the radially outer side of the clamp unit 13. Each body is composed of spaced, parallel plates 80 which are of such length as to extend beyond the clamp unit 14 when the latter is at its maximum distance from the clamp unit 14. Each body 79 includes a web 81 that is welded to the bars 20 and 21 of the clamp unit 13. Welded to the web 81 is an extension 82 adjacent the free end of which is an adjustable pressure member 83 like the members 34 and having at its radially inner end a foot or pad 84 that is adapted to bear forcibly against the member 4.

Adjacent the other end of the device 78, the members 80 are provided with notches 85 in their under surfaces, the notches being longer than the width of the clamp unit 14 and overlying the latter. Secured to and between the members 80 is a cylinder 87 within which is fixed one end of a hydraulic ram 88. The ram includes a piston rod 89 which is coupled to a reciprocable sleeve 90 accommodated in the cylinder 87. to the free end of the sleeve 90 is pivoted, as at 91, a bearing member or pad 92 which bears upon the clamp unit 14. The pad 92 and its associated parts are radially reciprocable by means of the ram 88.

Fitted to each of the two lower shifting devices 78 is a pair of support legs 93 which separably engage and are supported by the pads 11 forming part of the supports 6.

The apparatus thus far described is especially adapted for use in the fitting and welding together of a generally cylindrical pipe section 94 to the pipe 4. The procedure in welding the members 4 and 94 to one another will be described primarily with reference to FIGS. 1, 2, 18, and 19.

At the commencement of operations, the apparatus will be in the condition shown in FIG. 18, i.e., the clamp units 13 and 14 are in their radially expanded condition and are supported on the frame 6 via the legs 93. The spacing between the clamp units 13 and 14 is at a maximum. The pipe 4 is supported in the rollers 3 and is so positioned that its free end 5 lies approximately midway between the clamp units 13 and 14. The pressure members 34 associated with the clamp unit 13 are adjusted so that each pad 42 extends radially inwardly the same distance from the clamp unit, such distance being that required to enable each pad to bear forcibly against the pipe 4 when the clamp 13 is radially contracted. The ram 30 associated with the clamp unit 13 then may be actuated to close or contract the clamp unit, thereby enabling each of the pressure members 34 to bear forcibly against the pipe 4 adjacent its free end 5.

During radial contraction of the clamp unit 13 the pressure members 34 will exert such force on the pipe 4 as to reshape or reform the configuration of the free end 5. That is, should the free end 5 of the pipe 4 be oval or otherwise non-cylindrical, as most often is the case, the configuration of the free end 5 will be reformed to one dictated by the relative positions of the pressure members 34 carried by the clamp unit 13.

Figure 17:
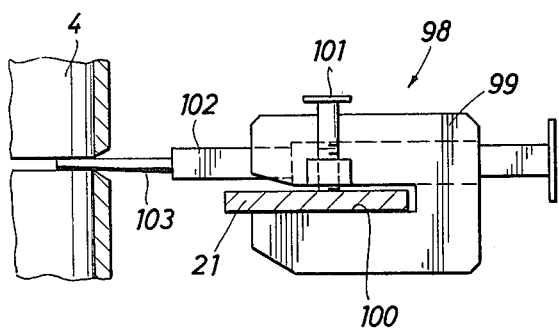
FIG. 17 is an enlarged, sectional view taken on the line 17—17 of FIG. 2.

Following clamping of the pipe 4, the member 94 may be moved by a suitable movable dolly, crane, or the like (not shown) so as to introduce one end of the member 94 into the radially expanded clamp unit 14. If the member 94 is to be butt welded to the member 4, as often is the case, the confronting ends of the members 4 and 94 normally will be beveled and will be spaced a short distance apart. To facilitate the provision of a space between confronting ends of the members to be welded, the clamp member 14 may be provided with a plurality, such as three, spacing devices 98, one of which is shown in FIGS. 2 and 17. Each spacing device comprises a bracket 99 having a slot 100 in which is accommodated a bar 21 of the clamp unit 14 and is retained thereon by a set screw 101. Slidably accommodated in the bracket 99 is a plunger 102 terminating in a tapered blade 103 which may be thrust between the confronting ends of the members 4 and 94 so as to provide therebetween a space.

Figure 6:
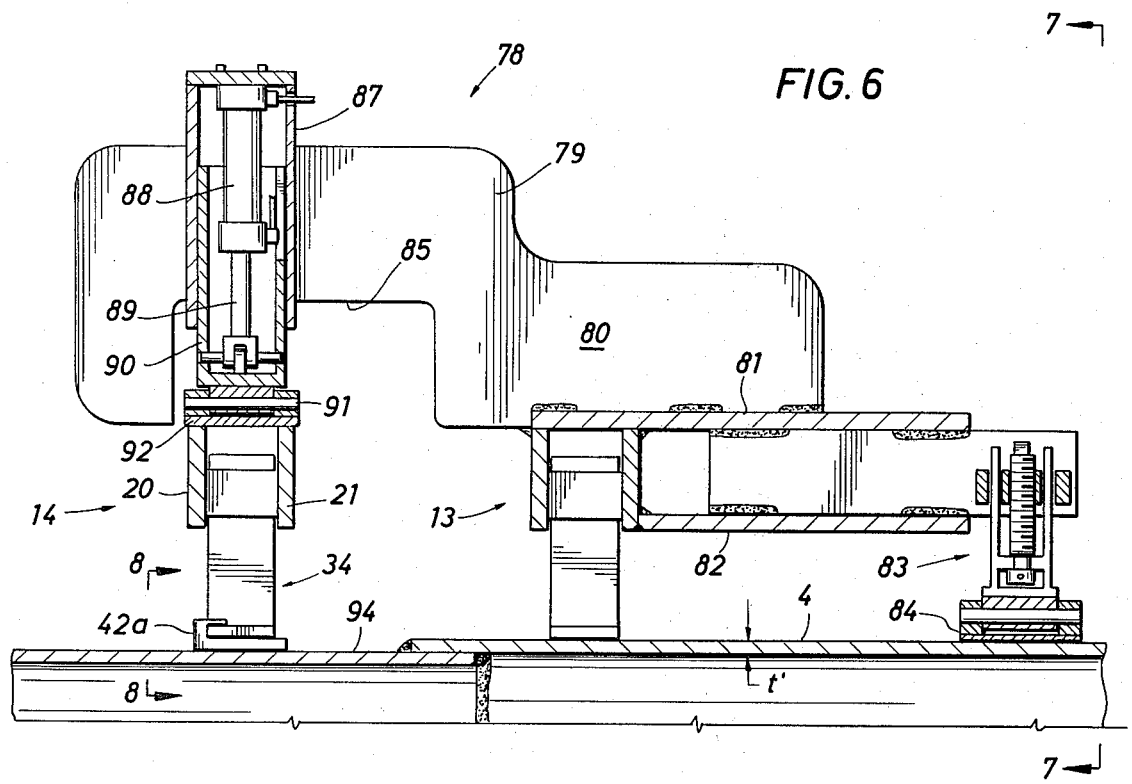
FIG. 6 is an enlarged sectional view taken on the line 6—6 of FIG. 2.
Figure 7:
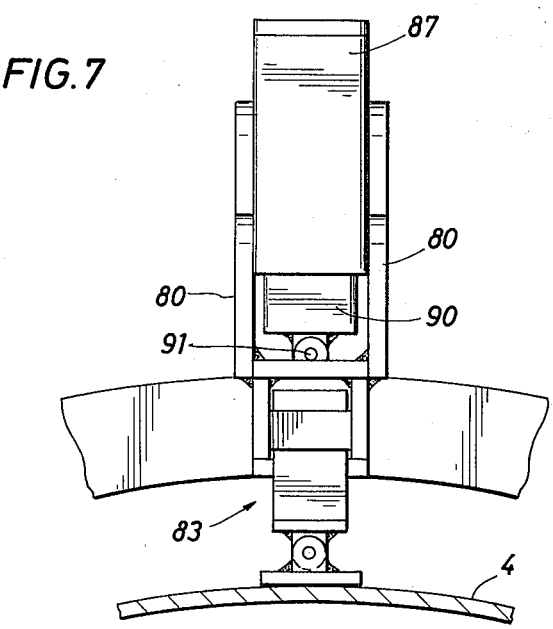
FIG. 7 is a sectional view taken on the line 7—7 of FIG. 6.
Figure 8:
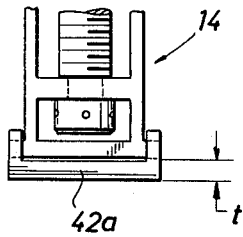
FIG. 8 is a view taken on the line 8—8 of FIG. 6.

Although the apparatus may be used for butt welding members to one another, it also may be used to weld such members to one another in telescoping relation, as is best shown in FIG. 6. If the diameters of the two members 4 and 94 initially are such that one member may fit snugly into the other, telescoping of the members will require close conformity of the configurations of the confronting end of the members. This may be accomplished by reforming the ends of the members as described earlier, but if the nominal outside diameter of the member 94 initially corresponds to the inside diameter of the member 4, the members 34 associated with the clamp unit 14 should be adjusted so that they protrude radially inwardly beyond the pressure members 34 associated with the clamp unit 13 a distance t (FIG. 8), slightly greater than the thickness t' (FIG. 6) of the wall of member 4. Alternatively, each of the pressure members 34 of the clamp unit 13 may be fitted with a shim 42a (FIG. 6).

Following adjustment of the pressure members 34 of the clamp unit 14 the ram 30 associated therewith may be actuated to contract the clamp unit, thereby applying a radially compressive force on the member 94 to reshape or reform the configuration of its free end.

Reforming the configurations of the confronting ends of the respective members 4 and 94 usually results in nonalignment of the longitudinal axes of such members at their confronting ends, thereby necessitating relative adjustment of the members transversely of their longitudinal axes. Such transverse adjustment may be effected by withdrawal of the supporting feet 11 from the positions shown in FIG. 18 to the positions shown in FIG. 19 following radial contraction of the clamp unit 14 and while the member 94 continues to be supported by its crane or dolly. The clamp member 14 and the free end of the member 94 thus are capable of movement transversely of the longitudinal axis of the member 4. Such transverse movement is effected by operation of selected ones of the adjusting devices 78, via the respective rams 88, so as to enable the force applying pads 92 to move radially inwardly or outwardly. It will be understood that the adjusting devices 78 are individually operable to enable precise adjustments of the relative positions of the members 4 and 94 to be obtained.

In the operation of the adjusting devices 78 in such manner as to vary the radial positions of the respective pads 92, it is important that the devices 78 do not rock about their connection to the clamp unit 13. It is for this purpose that the force applying members 83 are provided and, prior to operation of the adjusting devices 78, the feet 84 of the members 83 should be adjusted so that they bear against the member 4.

Following transverse adjustment of the clamp unit 14 and the member 94, the confronting ends of the members 4 and 94 may not always be in parallel planes. This condition may be corrected by operation of the drive rams 46 and 47 so as to effect rocking of the clamp unit 14 relative to the clamp unit 13 until the confronting ends of the members lie in parallel planes. During such rocking movements the clamp unit 14 may slide relative to the bearing pads 92.

Following the adjustments referred to above, all of the drive rams 46 and 47 may be operated simultaneously, thereby enabling the coupling chains 57 to draw the clamp unit 14 toward the clamp unit 13. Again, the clamp unit 14 may slide relative to the bearing pads 92.

Since the clamp member 14 forcibly clamps the member 94, the free end of the latter will be telescoped into the member 4, as is shown in FIG. 6. Following telescoping of the two members, they may be welded together.

Following telescoping of the members 4 and 94 there will be sufficient space between the clamp members 13 and 14 to permit welding of the members together without interference with the clamp units.

Figure 24:
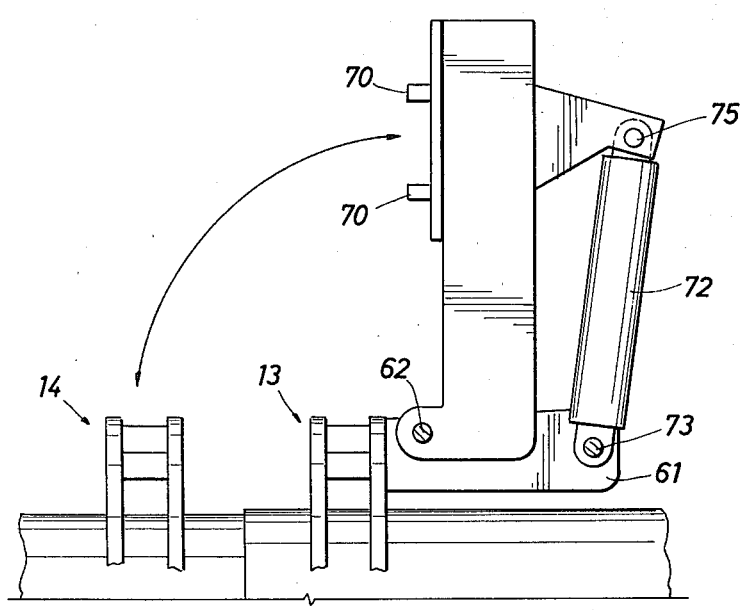
FIG. 24 is a fragmentary view, on an enlarged scale, of the apparatus of FIGS. 21-23 in an adjusted position.

When the apparatus shown in FIGS. 21-24 is used in lieu of the drive rams 46 and 47 and their associated parts, the results obtained are the same. When the apparatus 60 is used, the arm 63 is maintained in its inactive position, as shown in FIG. 24, until such time as the clamp unit 14 is applied to the member 94, following which the ram 72 is extended to swing the arm 63 to a position in which the clamp unit 14 is accommodated between the driving lugs 70. Thereafter the rams 66 of the several devices 60 may be operated independently of one another to rock the clamp unit 14 and locate the confronting of the members 4 and 94 in parallel planes, following which all the rams 66 are retracted simultaneously to move the clamp unit 14 toward the clamp unit 13, such movement being accompanied by movement of the member 94.

Figure 20:
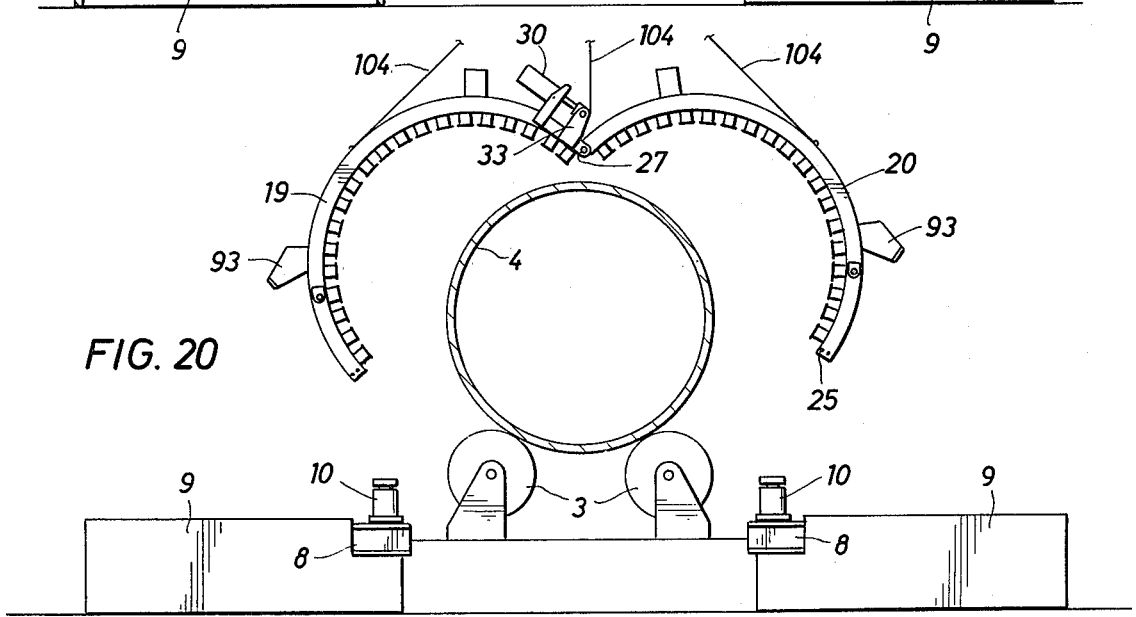
FIG. 20 is a view similar to FIG. 19, but illustrating the clamping mechanism in an open condition.

Following welding of the members 4 and 94 to one another, the supporting feet 11 are returned to their projected positions underlying the legs 93 and the clamp units 13 and 14 are expanded radially so as to release the welded members. If desired, the pins 25 may be removed from between the segments 17 and 18 and cables 104 from an overhead hoist (not shown) may be coupled to the clamp units so as to open the clamp units, as shown in FIG. 20, to facilitate substitution of unwelded members for the welded members.

Figure 15:
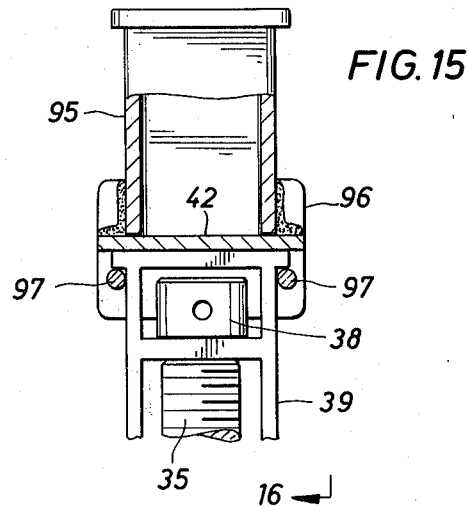
FIG. 15 is a view similar to FIG. 13, but illustrating an attachment for the bearing member.
Figure 14:
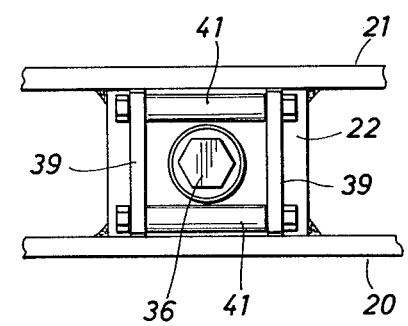
FIG. 14 is a plan view of the bearing member as viewed in the direction of the arrows 14—14 of FIG. 13.
Figure 16:
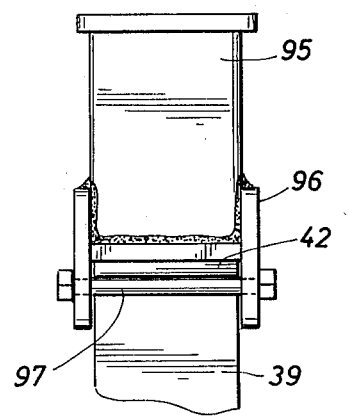
FIG. 16 is an elevational view of the apparatus shown in FIG. 15 as viewed in the direction of the arrows 16—16.

Apparatus constructed in accordance with the invention may be utilized in the welding of cylindrical members of considerably different diameters. In, for example, the members 4 and 94 are to be replaced by other, similar members having diameters less than that of the members 4 and 94, the length of each pressure member 34 can be enlarged by fitting an extension 95 thereto. See FIGS. 15 and 16. Each extension carries side plates 96 spanned by rods 97 adapted to embrace the web 42 of the associated member 34. Extensions of different length may be provided to permit wide variations in the diameters of pipes that can be used with the apparatus of the invention.

Apparatus constructed in accordance with the invention is particularly useful in welding closures to the ends of a hollow body so as to provide a tank or vessel. This characteristic of the construction is best shown in FIGS. 1, 2, and 9-11. In FIGS. 9-11 there is shown a closure 110 having a concavo-convex end wall 111 joined to a generally cylindrical rim 112 terminating in a free end 113. The rim 112 is engaged by the pressure members 34 of the clamp unit 14 in the same manner described earlier so as to position the free end 113 adjacent the free end 5 of the member 4. The adjusting devices 78 previously described may be used to adjust transversely the position of the closure 110 relative to the member 4. In addition, the apparatus includes a number of driving mechanisms 114 spaced circumferentially about the clamp unit 14 for further adjustment of the closure 110 relative to the member 4 and for moving the closure into abutting or telescoping relation with the member 4.

Each drive mechanism 114 includes a mounting bracket 115 fixed to the clamp unit 14, the bracket including an outwardly extending frame 116. At the outer end of the frame is pivoted, as at 117, one end of a hydraulic ram 118 having a piston rod 119 pivoted as at 120 to a bell crank 121 that is pivoted as at 122 to the bracket 115. To the crank 121 is secured a body 123 to the radially inner end of which is pivoted, as at 124, a force transmitting pad 125.

In the operation of the driving mechanisms 114 the rams 118 are retracted until such time as the closure 110 is positioned within the clamp unit 14 and adjacent the free end of the member 4. The rams 118 then may be extended to rock the bell cranks 121 counterclockwise from the position shown in FIG. 9 to the position shown in FIG. 10 in which the pads 125 are located radially inward of the clamp 14 and bear lightly against the end wall 111 for the purpose of assisting in the support of the closure 110. The clamp unit 14 then may be radially contracted, as hereinbefore described, to clamp and reform the rim 112. The adjusting devices 78 again may be operated in the manner described earlier. At the same time, however, the rams 118 of the driving devices 114 may be operated individually to assist in adjusting the position of the closure 110 relative to the member 4 so that the confronting ends of the members 4 and 110 are in parallel planes.

When the closure 110 is satisfactorily positioned with respect to the free end of the member 4, the rams 118 of the driving mechanisms 114 are operated simultaneously to move the closure 110 toward the member 4. In the arrangement disclosed in FIGS. 9 and 10, the rim 112 telescopes within the member 4, but it is of course possible to align the rim 112 with the end 5 of the member 4 to effect a butt weld therebetween.

The disclosure is representative of presently preferred methods and apparatus according to the invention, but is intended to be illustrative rather than definitive thereof. The invention is defined in the claims.

I claim:

1. Apparatus for use in welding a first member having a free end of generally cylindrical configuration to a second member having a free end of generally cylindrical configuration, said apparatus comprising first annular clamp means for encircling and clamping one of said members adjacent its free end; second annular clamp means substantially coaxial with said first clamp means for encircling and clamping said second member adjacent its free end; means mounting said first and second clamp means in axially spaced, substantially parallel relation such that the free ends of said members may lie adjacent and confront one another, said mounting means enabling relative axial, transverse, and rocking movements of said first and second clamp means; operating means reacting between and with said first and second clamp means and operable to effect said rocking and axial movements; and shifting means independent of said operating means and operable to effect said transverse movements of said first and second clamp means, said operating means and said shifting means being operable while said members are clamped by the respective clamp means.

2. Apparatus according to claim 1 including adjustable means carried by at least one of said clamp means and engageable with the associated member for reforming the configuration of its free end.

3. Apparatus according to claim 1 including adjustable means carried by each of said clamp means and engageable with the associated members for reforming the configurations of the respective free ends.

4. Apparatus according to claim 1 wherein said operating means comprises fluid pressure means carried by one of said clamp means and means coupling said fluid pressure means to the other of said clamp means.

5. Apparatus according to claim 4 wherein said operating means is capable of transmitting tensile force only from said one of said clamp means to the other of said clamp means.

6. Apparatus according to claim 4 wherein said operating means is selectively capable of transmitting tensile and compressive forces from said one of said clamp means to the other of said clamp means.

7. Apparatus according to claim 1 wherein said mounting means includes support means for supporting said first and second clamp means independently of the associated members.

8. Apparatus according to claim 7 including means for moving said support means into and out of supporting engagement with said first and second clamp means.

9. Apparatus according to claim 1 wherein each of said clamp means comprises a number of arcuate sections together forming an annulus.

10. Apparatus according to claim 9 including adjusting means coupled to two adjacent ones of said arcuate sections and operable to expand and contract the diameter of said annulus.

11. Apparatus for use in welding a first body member having a free end of generally cylindrical configuration to a second body member having a free end of generally cylindrical configuration, said apparatus comprising first annular clamp means for encircling and clamping one of said body members adjacent its free end; second annular clamp means substantially coaxial with and parallel to but axially spaced from said first clamp means for encircling and clamping said second body member adjacent its free end, said first and second clamp means beings operable to clamp the respective body members independently of each other; operating means mounted on one of said clamp means in a position to react with the other of said clamp means and effect relative axial and rocking movements of said first and second clamp means; and shifting means independent of said operating means for effecting relative transverse movement of said first and second clamp means, said operating means and said shifting means being operable while said body members are clamped by the respective clamp means.

12. Apparatus according to claim 11 wherein at least one of said clamp means includes adjustable force applying means engageable with the associated body member for reforming the configuration of its said end.

13. Apparatus according to claim 11 wherein each of said clamp means includes adjustable force applying means engageable with the associated body member for reforming the configuration of its said end.

14. Apparatus according to claim 11 wherein said first and second clamp means are of substantially uniform diameter, at least one of said clamp means including force applying means engageable with the associated body member for radially contracting its said end.

15. Apparatus according to claim 11 including means for supporting both of said clamp means independently of the associated body members.

16. Apparatus according to claim 15 including means for moving said supporting means into and out of engagement with said first and second clamp means.

17. Apparatus for use in welding to one end of a generally cylindrical hollow body a closure having a wall terminating in a generally cylindrical rim having a free edge, said apparatus comprising first annular clamp means for clampingly encircling said body adjacent one end thereof; second annular clamp means substantially coaxial with and parallel to but axially spaced from said first clamp means for encircling said rim with the free edge of the latter confronting said one end of said body; means for mounting said first and second clamp means in spaced, substantially coaxial relationship; force transmitting means; means mounting said force transmitting means on one of said clamp means for movements into and out of a position radially inward of said one of said clamp means and in which position said force transmitting means is operable to engage and apply a force on said wall of said closure in a direction to move the latter toward said one end of said body; and drive means connected to said force transmitting means for moving the latter to said position and for applying sufficient force on said force transmitting means when the latter is in said position to effect movement of said closure in said one direction.

18. Apparatus according to claim 17 wherein said rim has a diameter so related to that of said body as to enable said rim to telescope relative to said body, and wherein said drive means has a range of movement sufficient to effect telescoping of said rim relative to said body.

19. Apparatus according to claim 17 wherein said rim prior to being clamped by second clamp means has a diameter corresponding substantially to that of said body, said second clamp means when encircling said rim compressing the latter radially an amount sufficient to enable said rim to be accommodated within said body.

20. Apparatus according to claim 17 including support means for supporting said first and second clamp means independently of said body and said closure.

21. Apparatus according to claim 20 including means for moving said support means into and out of supporting engagement with first and second clamp means.

22. Apparatus according to claim 17 including operating means carried by one of said clamp means in a position to react with the other of said clamp means and effect relative axial, transverse, and rocking movements of said first and said second clamp means.

23. Apparatus according to claim 17 wherein said drive means is operable to effect relative movement of said closure and said second clamp means.

24. A method of aligning for welding a pair of generally cylindrical members end-to-end, said method comprising supporting said members adjacent one another in substantially coaxial relation with their adjacent ends in confronting, axially spaced relation; applying a radial clamping force to one of said members adjacent its end; applying a radial clamping force to the other of said members adjacent its end; applying on one of said members axially directed force operable selectively to rock and axially move said one of said members and position the confronting ends of said members substantially parallel to one another; applying on one of said members a radial force independent of said axially directed force and said clamping force to effect relative transverse movement of said members; and maintaining the clamping forces on said members during the relative axial, rocking, and transverse movements thereof.

25. A method to claim 24 including shaping the confronting ends of said members to such configuration that said members telescope in response to relative movement of said members to said position.

26. A method according to claim 24 wherein the confronting ends of said members are generally cylindrical, and including applying a radially compressive force on one of said members sufficient to enable telescoping of said members in response to relative movement of said members to said position.

27. A method according to claim 26 wherein said compressive force is applied to said other of said members.

28. A method according to claim 24 including applying to said members clamping forces of such magnitude as to shape their ends to selected configurations.

* * * * *